Feb. 28, 1950     D. C. ZIPP ET AL     2,499,124
APPARATUS FOR PROTECTING OPERATING PARTS
OF VISES FROM CHIPS OR OTHER REFUSE
INCIDENTAL TO MACHINE WORK
Filed May 29, 1947     2 Sheets-Sheet 1
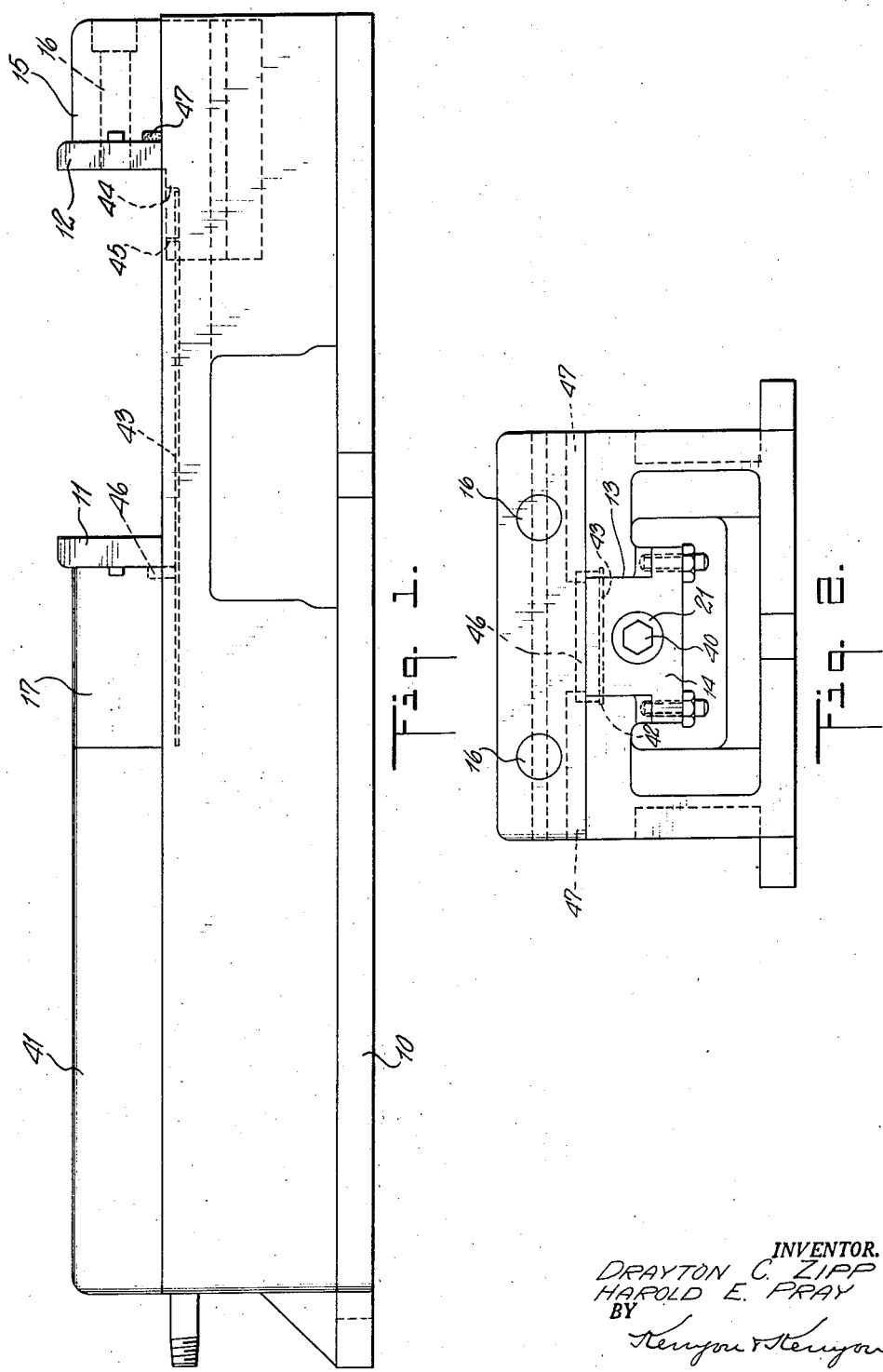
INVENTOR.
DRAYTON C. ZIPP
HAROLD E. PRAY
BY
Kenyon & Kenyon
ATTORNEYS

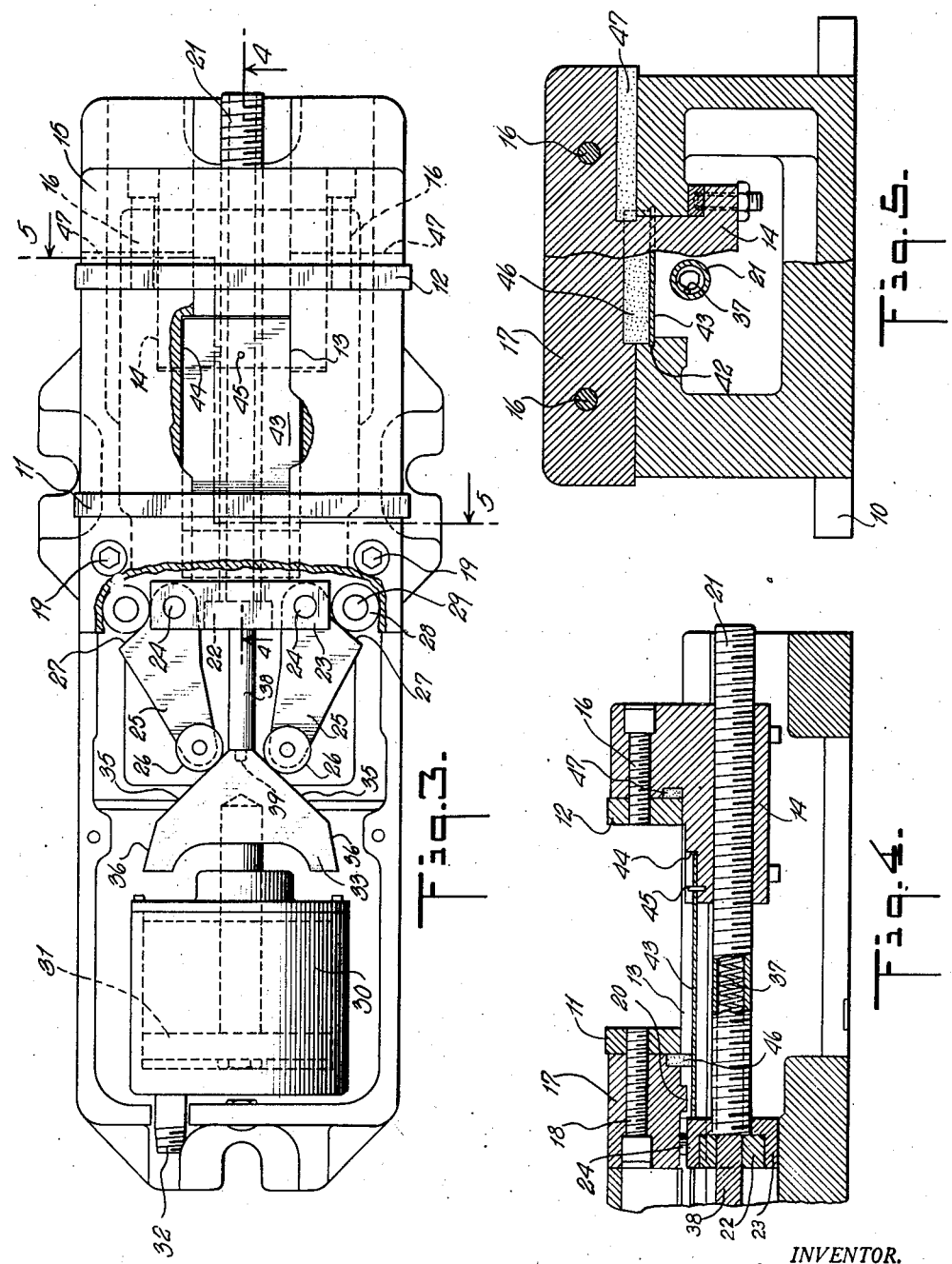

Patented Feb. 28, 1950

2,499,124

UNITED STATES PATENT OFFICE 2,499,124

APPARATUS FOR PROTECTING OPERATING PARTS OF VISES FROM CHIPS OR OTHER REFUSE INCIDENTAL TO MACHINE WORK

Drayton C. Zipp and Harold E. Pray, Whitehall, N. Y., assignors to Production Devices Incorporated, Whitehall, N. Y., a corporation of Connecticut Application May 29, 1947, Serial No. 751,318

3 Claims. (Cl. 81—17)

1

This invention relates to vises and more especially to fluid pressure operated vises of the type illustrated in the U. S. patent to Cedric B. Cross, No. 2,335,743.

An object of this invention is to provide in the type of vise above referred to an improvement whereby chips from the work supported by the device are prevented from interfering with the proper operation of the vise.

The vise consists essentially of a base having a T-slot in which is supported a carriage together with means for effecting reciprocation of the carriage. The carriage supports a movable jaw which cooperates with a stationary jaw supported by the base to grip securely a piece of work to be operated on by a milling machine or the like. A plate is slidably supported by grooves formed in the walls of the T-slot and at one end is connected to the movable jaw for movement therewith with its remaining end extending beneath the stationary jaw. A felt strip or the like is supported by the base adjacent the fixed jaw for engagement with the upper face of the plate to prevent chips or the like from being carried by the plate beneath the fixed jaw. Also, a felt strip or the like is attached to the movable jaw for engagement with the top surface of the base to keep it clear of chips.

Other objects, novel features and advantages of this invention will become apparent from the following specification and accompanying drawings, wherein:

Fig. 1 is a side elevation of a device embodying the invention;

Fig. 2 is an end view of Fig. 1;

Fig. 3 is a plan view of Fig. 1 partially broken away and with a part removed;

Fig. 4 is a section on the line 4—4 of Fig. 3, and

Fig. 5 is a section on the line 5—5 of Fig. 3.

A base 10 supports a stationary jaw 11 and a movable jaw 12. In the base is provided a keyway 13 in which is slidably mounted a carriage 14 having a projection 15 to which the jaw 12 is fastened by bolts 16. The fixed jaw 11 is secured to an abutment 17 by bolts 18 and the abutment 17 in turn is attached to the base by bolts 19, the abutment having a transverse rib 20 which fits into a correspondingly shaped transverse groove in the frame 10.

A hollow screw 21 is threaded through the lower part of the carriage 14 and is provided with a cylindrical head 22 which is arranged in a correspondingly shaped socket in a cross-bar 23. The arrangement is such that the screw 21 is rotatably

2 connected to the cross-bar 23 and moves in unison therewith axially of the screw. The cross-bar 23 is equipped with two pins or studs 24 on each of which is pivoted a lever 25 at the free end of which are mounted a pair of identical rollers 26 above and below the lever. Each lever is provided with a plane surface shoulder 27 angularly related to the line joining the axes of the roller 26 and the stud 24.

Each surface 27 engages a sleeve 28 supported by a pin 29 mounted in the frame 10 and projecting into the abutment member 17. Each sleeve 28 constitutes a fixed fulcrum for a lever 25 whereby with the levers in the position shown in Fig. 3 movement thereof causes movement of the cross-bar 23.

A pressure cylinder 30 of standard type and preferably, though not necessarily, an air pressure cylinder is mounted on the frame 10 near the left end thereof and is provided with the usual piston 31 which is movable to the right under pressure of air or other fluid delivered to the cylinder through the inlet 32. A head 33 projects from the end of the piston 31 and constitutes a wedge having two sets of surfaces 35 and 36 engageable with the rollers 26 upon rightward movement of the piston 31. The angularity of the surfaces 35 with respect to the direction of travel of the wedge is steeper than the angularity of the surfaces 36.

In the screw 21 is arranged a coil spring 37, the right end of which engages an abutment in the screw 21. The left end of the spring 37 engages the right end of a rod 38 projecting into the screw 21 with the left end of said rod being provided with a pin 39 seated in a recess in the nose of the head 33. The right end of the screw 21 is provided with a polygonal recess 40 to receive an adjusting key.

By means of an adjusting key inserted in the socket 40, the position of the movable jaw 12 relative to the stationary jaw 11 is adjustable by rotation of the screw 21. Such rotation of the screw 21 feeds the carriage 15 to the left or to the right, depending upon the direction of rotation of the screw.

After adjustment of the movable jaw 12, the vise is ready for operation and the work to be clamped is placed on the frame 10 between the two jaws and fluid is admitted to the cylinder 30 through the inlet 32 from any suitable source (not shown). The introduction of fluid into the cylinder 30 causes the piston 31 to move to the right from the position shown in Fig. 1 thereby causing the levers 25 to swing apart by reason of the rollers 26, riding along first the surfaces 35 and then the surfaces 36 of the head 33. Such rotation of the levers 25 causes leftward movement of the cross-bar 23 by reason of the engagement of the shoulders 27 with the fulcrums 28 thereby moving the cross-bar 23 leftward. The leftward movement of the cross-bar 23 is communicated through the head 22, screw 21 and carriage 15 to the movable jaw 12 to bring it into clamping relation to the work-piece between it and the stationary jaw 11. Also, leftward movement of the screw 21 in combination with rightward movement of pin 38 compresses the springs 37. Upon release of the fluid from the cylinder 30, the spring 37 is effective to return the wedge 34, levers 25, cross-bar 23, screw 21 and movable jaw 12.

During the initial portion of the rightward movement of the wedge 34, the levers 25 are swung outwardly at comparatively high speed, thus bringing the jaw 12 to the left with rapid relatively low-force movement. This action is due to the relatively steep angularity of the surfaces 35. However, when the rollers 26 engage the surfaces 36, the movement of the jaw 12 becomes less rapid but of more powerful force due to the fact that the surfaces 36 are less steep.

A cover 41 is supported by the base 10 and encloses the pressure cylinder as well as the head 33, levers 25 and cross-bar 23.

In each of the two vertical walls of the keyway 13 there is provided a horizontal groove 42 in which is slidably supported a plate 43 of sufficient extent to span the gap between the two jaws 11 and 12 when the latter is in its most remote position with respect to the former. One end of the plate 43 is arranged in a recess 44 formed in the carriage 14 and is attached to the carriage by means of a pin 45 so that the plate moves in unison with the carriage. A strip of felt 46 is seated in a recess formed for that purpose in the abutment 17 and projects downwardly into contact with the upper surface of the plate 43.

The plate 43 catches any chips or the like which may fall from a piece of work supported between the jaws 11 and 12 and being operated on by some form of tool, thus preventing the chips from getting into the working parts of the device. The felt strip 46 prevents chips collected by the plate 43 from working their way to the left into the parts of the vise.

Two strips of felt 47 are received in a recess provided for that purpose in the projection 15 and have their bottom surfaces engaging the top surfaces of the bed 10 on either side of the keyway 13. These strips serve to brush off from the bed surface any chips that may fall thereon and prevent the same from getting into the working parts of the vise.

It is of course understood that various modifications may be made in the structure above described without in any way departing from the scope of the invention as defined in the appended claims.

We claim:

1. A vise comprising a base having an inverted T-slot, a fixed jaw supported by said base above said inverted T-slot, a carriage having a portion movable over said base and a portion slidably supported by said base in said slot, a jaw secured to said first-named portion of said carriage, said first-named portion having a recess, a felt strip positioned in said recess and held therein by said second-named jaw in contact with the upper surface of said base for movement thereover with said carriage, means for reciprocating said movable carriage and a plate slidably supported in grooves formed in opposite walls of said T-slot below the level of said upper surface of said base and extending between said two jaws and onto a recess in said second-named portion of said carriage, said plate being connected to said carriage in said last-named recess for movement with said carriage.

2. A vise according to claim 1 characterized by a felt strip or the like supported by said base adjacent said fixed jaw for engagement with the upper face of said plate.

3. A vise according to claim 2 in which said base-supported felt strip extends transversely of the direction of movement of said plate.

DRAYTON C. ZIPP.
HAROLD E. PRAY.

REFERENCES CITED

The following references are of record in the file of this patent:

UNITED STATES PATENTS

| Number | Name | Date |
|---|---|---|
| 1,385,088 | Mellor | July 19, 1921 |
| 1,811,299 | Brockhaus | June 23, 1931 |
| 2,113,087 | Jensen | Apr. 5, 1938 |
| 2,335,743 | Cross | Nov. 30, 1943 |